Dec. 5, 1939. J. C. TARBELL 2,182,414
BEARING MEMBER
Filed May 14, 1938

INVENTOR
JOHN C. TARBELL
BY Harness, Lind, Pates & Harris.
ATTORNEYS.

Patented Dec. 5, 1939

2,182,414

UNITED STATES PATENT OFFICE 2,182,414

BEARING MEMBER

John C. Tarbell, Springfield, Mass., assignor to Chrysler Corporation, Highland Park, Mich., a corporation of Delaware Application May 14, 1938, Serial No. 207,882

6 Claims. (Cl. 308—121)

This invention relates to improved bearings and bearing including structures.

More particularly, the invention pertains to the provision of a plurality of spaced bearing surfaces on the same piece of bearing material which is adapted to serve structural functions in the device in which it is embodied.

One of the main objects of the invention is the provision of a multiple journal bearing member which has a substantially large porous metal body portion capable of retaining a correspondingly large absorbed lubricant content and which is adapted to supply such lubricant to all of the bearing surfaces of the journal bearings formed therein.

Another object of the invention is the provision of a bearing member of this character which may be relied upon to serve as the main structural supporting elements of the device in which it is embodied.

Another object of the invention is the provision of combined body structural members of this kind which may be conveniently drilled to provide bearing surfaces and assembled with the bearing surfaces of the respective members in accurate alignment.

Additional objects of the invention are the provision of multiple bearing members of this kind which may be conveniently formed from sheet-like porous metal stock, to provide reinforced sheet-like porous metal bearing members having a plurality of bearing surfaces thereon, and to provide bearing members of this kind which do not require frequent lubricant replenishment.

Other objects and advantages of the invention will be more apparent from the following description taken in connection with the accompanying drawing, in which.

Figure 1:
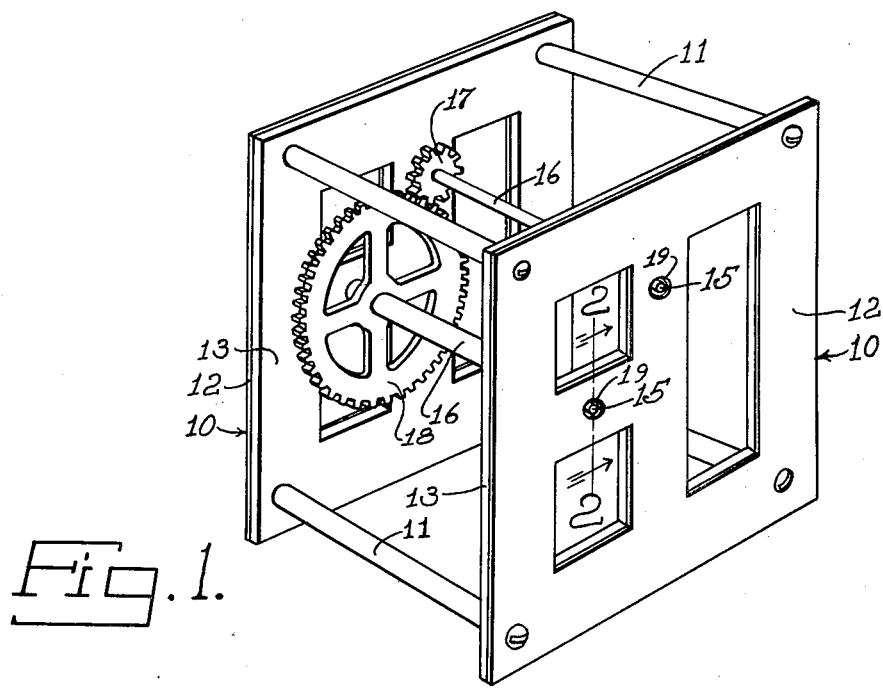
Fig. 1 is a perspective view of a mechanism embodying the invention.

In Fig. 1 of the drawing is illustrated somewhat diagrammatically an embodiment of the invention in the frame work and operating mechanism of a clock. This mechanism includes a pair of spaced side walls, generally designated by the numeral 10, which are held in spaced relationship by spacing struts 11. Each side wall 10 includes an outer sheet-metal reinforcing backing 12, preferably comprising sheet steel, brass or other suitable solid metal, and an inner sheet-like element 13 which is integrally bonded thereto.

The sheet-like elements 13 are formed from compressed and sintered powdered metal, in the manner hereinafter set forth and they are provided with a substantial uniformly distributed porosity for facilitating the retention of a suitable lubricant. Each sheet-like porous metal element 13 is provided with a plurality of cylindrical bores or apertures 14 in which are journalled reduced end portions 15 of shafts 16 which are included in the operating parts of the clock mechanism. The shafts 16 have non-rotatably secured thereon a meshed gear and pinion 17 and 18, respectively. Apertures 19 are formed in the reinforcing backing plates 12 in concentric relationship with respect to the apertures 14 of the porous metal elements 13. The apertures 19 are, as illustrated in Fig. 2, preferably of a larger diameter than the apertures 14 in order to accommodate extension of the reduced end portions 15 beyond the outer side surface of the porous metal plates 13 and into non-contacting relationship with respect to the reinforcing plates 12.

While, for the purpose of illustrating an embodiment of the invention, a clock frame and clock mechanism have herein been referred to, it should be understood that the invention may be embodied in numerous devices and with particular advantage when such devices comprise a multiplicity of parts which are moved rotatively or otherwise with respect to and while in contact with the frame structures of the devices.

Figures 2, 3, 4:
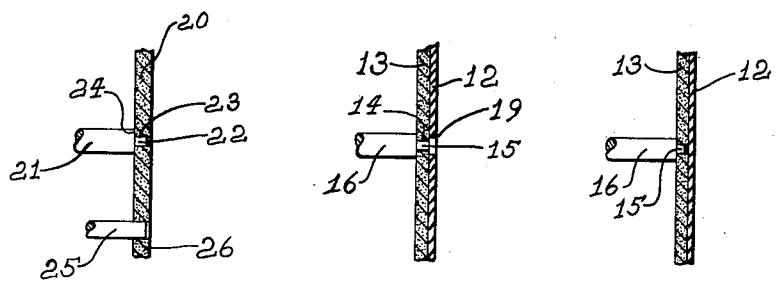
Fig. 2 is a vertical sectional view taken as indicated by the line 2—2 of Fig. 1.
Fig. 3 is a vertical sectional view corresponding to Fig. 2 but illustrating a modified form of the invention.
Fig. 4 is a vertical sectional view corresponding to Fig. 2 but illustrating still another modified form of the invention.

In many instances the use of reinforcing backing plates will be found to be unnecessary and in these cases, the side wall frame parts, corresponding to the walls 10 of the clock mechanism shown in Fig. 1, may comprise a single sheet of porous metal such as that shown at 20 in Fig. 3. When it is desired to use the sheet-like porous metal structure for thrust resisting purposes the shaft, designated by the numeral 21 in Fig. 3, may be provided with a reduced end portion 22 which is journalled in a cylindrical passage or aperture 23 formed in the sheet-like element 20. The provision of the reduced end portion 22 on the shaft 21 results in the presence of a shoulder 24 which may bear against the porous metal surfaces of the sheet-metal element 20 surrounding the aperture 23 thereof. When it is not desired to apply axial thrust of the shaft upon the porous metal sheet-like element 20, the reduced end portion of the shaft may be omitted as illustrated in the shaft 25 shown in Fig. 3, and the shaft may be journalled in an aperture 26 formed in the porous sheet-like element 20.

In some instances it may be found desirable to omit the aperture 19 of the reinforcing plates 12 and in this case precaution may be taken to prevent engagement of the extremities of the reduced end portions 15 of the shafts 16 by so predetermining the lengths of these reduced end portions that they will be held against engagement with the reinforcing plates 12 by the shoulder on the shaft adjacent the reduced end portions.

Sheet-like porous metal structures adapted to serve as anti-friction bearing elements for a multiplicity of movable members may be made in numerous ways, for example, a charge of suitable powdered metal may be compressed between dies to a briquette of a desired shape and then sintered, preferably in a reducing or a non-oxidizing atmosphere. When the reinforcing backing plates 12 are employed, the briquette may be sintered and then bonded directly or by an intermediate bonding layer to one side of the reinforcing plates, or the briquette may be placed in a superimposed relationship upon a backing plate 12 and then simultaneously sintered and bonded thereto by heating the assembly while under moderate compression in a reducing or non-oxidizing atmosphere. The sheet-like porous metal elements of the type embodying the invention may be made in accordance with the disclosure in copending application Serial No. 77,324, filed May 1, 1936, in which a change of powdered metal is preferably formed into a continuous sheet-like briquette by passing it between rolls. The briquette may then be sintered by heating it from substantially 1500° F. to 1550° F. when the powdered metal charge comprises a mixture of powdered tin and powdered copper. The apertures 14, 23 or 26 may be punched, drilled, or otherwise suitably provided in the porous metal structure either before or after sintering thereof.

It has been found that satisfactory sheet-like porous metal may be formed from charges of powdered materials having the following compositions:

| No. 1: | Percent by weight |
|---|---|
| Powdered lead | 10 |
| Powdered tin | 10 |
| Powdered graphite | 1½ |
| Powdered boric acid | 1½ |
| Powdered copper | 77 |
| No. 2: | |
| Powdered tin | 10 |
| Powdered boric acid | ½ |
| Exfoliated mica | 1½ |
| Powdered copper | 88 |
| No. 3: | |
| Powdered copper | 20 |
| Powdered graphite | 1½ |
| Powdered boric acid | .1 |
| Powdered iron | 77.5 |

The sintering temperature required depends upon the nature of the powdered metals employed in the structure and when sintering a composition, such as that set forth under No. 3, in which powdered iron is included, the sintering temperature of from 1900° F. to 2200° F. is suitable.

Any of the foregoing porous metal structures may be provided with a self-contained liquid lubricant content by immersing them, preferably while hot, in a suitable oil bath. If desired, solid lubricants may be introduced into the pores of the structure in any suitable manner.

The sheet-like porous metal elements 13 may be relied upon to rotatably or otherwise non-frictionally support a plurality of members which are rotatable or otherwise movable with respect thereto. These porous metal elements also serve as structural portions of the body of the device in which they are embodied. The porous metal surfaces surrounding the apertures in the sheet-like porous metal elements 13 accommodate the flow of lubricant to the journal surfaces provided therein. By employing porous sheet-like bearing elements 13 in the frame structure of the device and providing therein a multiplicity of apertures or anti-friction surfaces, the necessity of assembling separate and individual bearing means in the frame work of the device is eliminated. A relatively large proportion of porous metal with respect to bearing surface assures an ample supply of lubricant for the entire life of the device.

Although but several specific embodiments of the invention are herein shown and described, it will be understood that various changes in the size, shape and arrangement of parts may be made without departing from the spirit of invention.

What I claim is:

1. In a device including a frame part and an element adapted for movement relative thereto, said frame part comprising spaced walls each including a combined body structural and anti-friction bearing member comprising a sheet-like section of porous metal constituting the major stress sustaining structural portion of said device and having a bearing surface integral therewith for contacting with said movable element, said member having a self-contained lubricant content adapted to be supplied to said surface through the pores of said member.

2. In a device including a rotative member having reduced and normal portions, and a frame body structure; a combined body frame structural and bearing forming member constituting a substantial portion of the body of said device and comprising a reinforcing backing and a lubricant impregnated, sintered, porous metal element bonded thereto, said backing being provided with an opening of greater diameter than that of said reduced portion of said rotative member, said porous metal element being provided with a cylindrical passage in alignment with said opening of said backing, the wall of said passage journalling said reduced portion of said rotative member, a side face of said porous metal element forming a thrust surface for abutting said normal portion of said rotative member.

3. A clock comprising a frame structure having a pair of spaced wall members, said wall members including facing sheet-like porous metal lubricant impregnated sections of substantial area having registering apertures therein, and a plurality of shafts extending between said wall members having end portions journaled in the openings in said sections respectively.

4. An article of manufacture comprising a body structure including spaced walls constituting the main support part of the article, at least one of said walls including a sheet-like section of lubricant absorbed porous metal material having an opening therein, and a reinforcing sheet of steel bonded thereto, and an element adapted for rotary movement extending between said walls and having an end portion extending into said opening, the wall bounding the latter constituting a bearing surface for said member.

5. An article of manufacture comprising a body structure having spaced walls each including a sheet-like section of porous metal material constituting the main supporting part of the article, each of said sheet-like sections having an opening therein, and a relatively rotatable member having portions thereof extending into said openings respectively, the wall bounding each of said openings constituting a bearing surface for said member.

6. An article of manufacture comprising a body structure having spaced walls, each constituting support means for the article including a sheet-like section of porous metal material, each of said sheet-like sections having an opening therein, and a relatively rotatable member having reduced end portions thereof extending into said openings respectively, the wall bounding each of said openings constituting a bearing surface for said member, said member having face portions adapted to thrust against the adjacent side faces respectively of said sections.

JOHN C. TARBELL.